United States Patent [19]

Dieffenbach

[11] Patent Number: 4,686,666
[45] Date of Patent: Aug. 11, 1987

[54] FLEXIBLE MICRO DISK

[75] Inventor: Harry N. Dieffenbach, Fremont, Calif.

[73] Assignee: dcTEQ, Fremont, Calif.

[21] Appl. No.: 879,486

[22] Filed: Jun. 27, 1986

[51] Int. Cl.$^4$ .......................... G11B 5/82; G11B 23/00
[52] U.S. Cl. ...................................... 369/290; 360/133
[58] Field of Search ................ 369/290, 289; 360/133, 360/135

[56] References Cited

U.S. PATENT DOCUMENTS

| 4,149,207 | 4/1979 | Porter et al. | 360/133 |
| 4,216,511 | 8/1980 | Bilek | 360/133 |
| 4,503,530 | 3/1985 | Hinlein et al. | 369/290 |
| 4,628,388 | 12/1986 | Kawabe | 360/133 |
| 4,631,620 | 12/1986 | Oishi et al. | 360/133 |

FOREIGN PATENT DOCUMENTS

WO81/01906  7/1981  PCT Int'l Appl. .................. 360/133

Primary Examiner—Steven L. Stephan
Attorney, Agent, or Firm—Thomas E. Schatzel

[57] ABSTRACT

A micro disk for data storage has a media portion of flat circular shape with a central opening therein. A hub portion has a pilot protrusion that interfits with the central opening to mechanically lock the media portion against rotation on the hub portion. The media portion is supported adjacent the central opening to maximize the unsupported radial dimension from the media support to the inner recording track. Thus good flexiblity at the inner recording track of the media portion compensates for variations of the spindle-to-head dimension in disk drive systems and makes the disk suitable for double sided, high density, data storage applications. A modified hub portion is centered on a drive spindle by a leaf spring within the hub portion.

10 Claims, 11 Drawing Figures

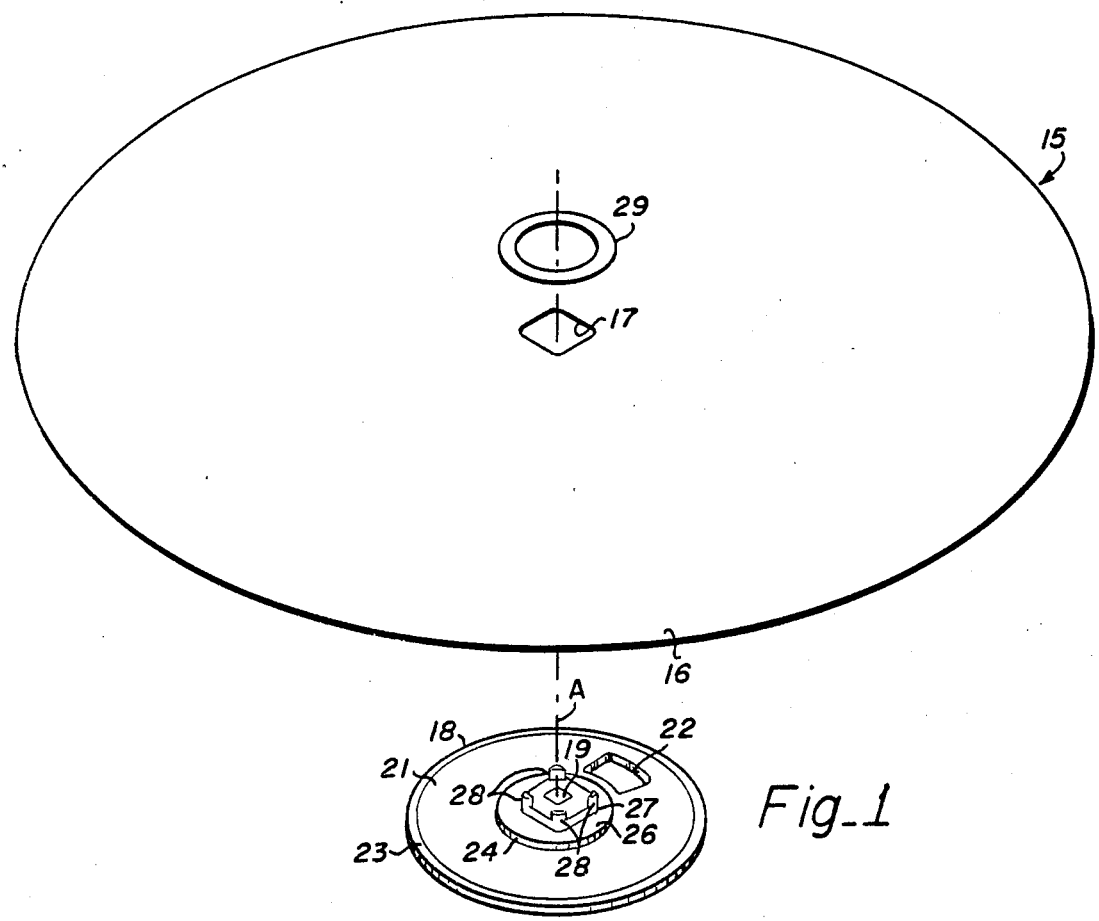
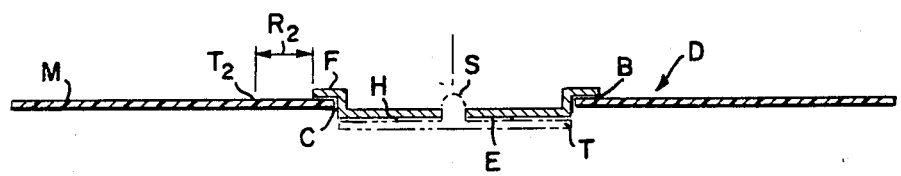
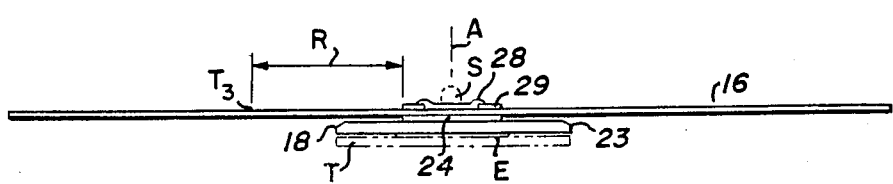

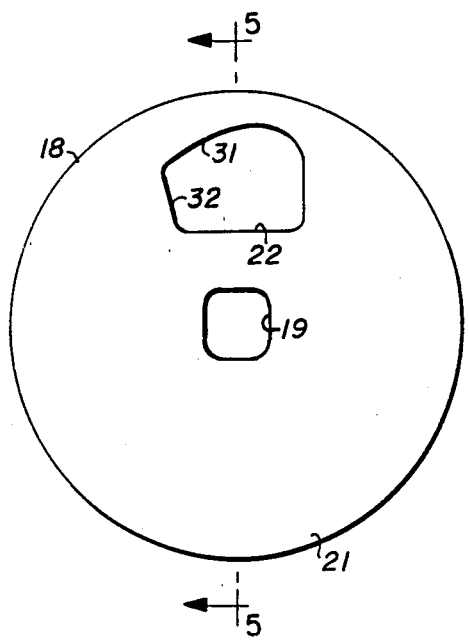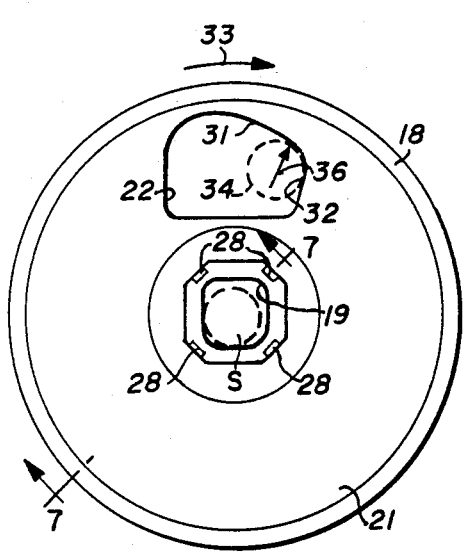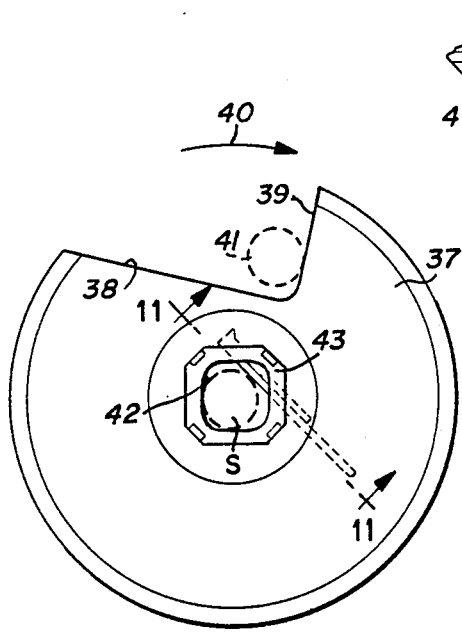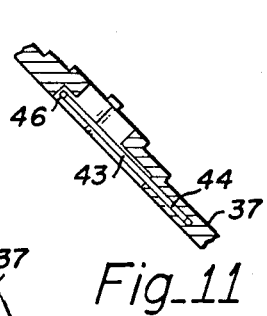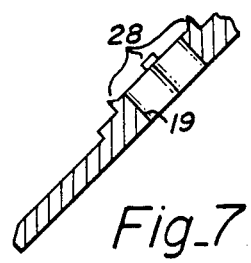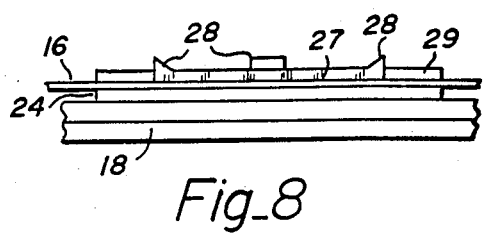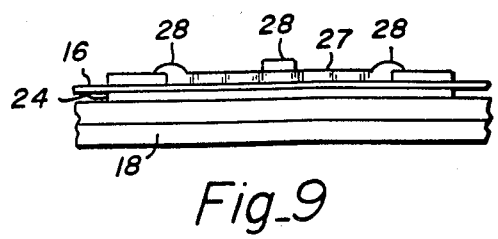

FLEXIBLE MICRO DISK

BACKGROUND OF THE INVENTION

1. Field of the Invention

This invention relates generally to flexible micro disks for data storage. More specifically, it concerns a media/hub assembly to enhance double sided, high density operations of a 3 $\frac{1}{2}$" micro disk.

2. Description of the Prior Art

In the current standard media/hub assembly, a hub has a hollow cylindrical portion closed at one end by a coupling plate and having a flange projecting radially outward from the opposite end. A media ring has a central opening through which the cylindrical portion of the hub fits. The media ring is bonded by an adhesive to the radial flange of the hub. This assembly has performed inadequately for double sided, high density, data storage applications. One problem is stiffness of the media at the inner recording tracks. Such stiffness effects head loading that results in read/write performance inconsistencies. It also impacts drive torque requirements due to increased friction. Another problem is angular displacement between the hub and media due to creepage of the adhesive. These problems are ampliried by inconsistencies and wide tolerances of the head-to-spindle dimension in the 3 $\frac{1}{2}$" micro disk drive systems that are available.

SUMMARY OF THE INVENTION

An object of the present invention is to provide a micro disk suitable for double sided, high density, data storage applications.

Another object is to provide a media/hub assembly with a media portion that is made more flexible along its recording area.

A further object is to provide a media/hub assembly wherein the media portion is mechanically locked against rotation upon the hub portion.

An additional object is to provide a media/hub assembly that includes resilient means for centering the assembly on a drive spindle and a torque transmission edge that is driven by a drive dog.

Briefly, the present invention includes a media portion of flat circular shape having a central opening therein and a hub portion having a central axis. The hub portion includes means for supporting the media portion adjacent the central opening in a radial plane relative to the central axis of the hub portion. The hub portion also includes coupling means by which the hub portion can be axially positioned, radially centered and rotated. The coupling means is spaced axially of the hub from the media support means and projects radially of the central axis by a greater dimension than the radial projection of the media support means. Thus, the media extends unsupported radially outward from the media support means beside the coupling means and there beyond so that the media portion beyond the coupling means is flexible.

In a preferred embodiment of the invention, the media portion is mechanically locked against rotation upon the hub portion. A media/hub assembly has resilient means for centering the assembly on a drive spindle and a torque transmission edge that is driven by contact with a drive dog.

An advantage of the present invention is flexibility in the recording area on the media portion of a micro disk, to compensate for variations of the spindle-to-head dimension across a broad spectrum of drives.

Another advantage is mechanically locking the media portion against rotation upon the hub portion to eliminate angular displacement.

A further advantage is a simplified media/hub assembly having resilient means for centering the assembly on a drive spindle and a torque transmission edge that is driven by contact with a drive dog.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is an exploded perspective view of a micro disk media/hub assembly embodying the present invention;

FIG. 2 is a transverse sectional view of a prior art micro disk media/hub assembly;

FIG. 3 is a side elevational view of the media/hub assembly shown in FIG. 1;

FIG. 4 is an enlarged bottom or under side view of the hub portion of the assembly shown in FIG. 3;

FIG. 5 is a section taken along line 5—5 of FIG. 4;

FIG. 6 is a side view of the hub portion taken from the side opposite that shown in FIG. 4;

FIG. 7 is a partial section taken on the line 7—7 of FIG. 6;

FIGS. 8-9 are enlarged assembly views with FIG. 8 showing the locking tabs before deformation and FIG. 9 showing the locking tabs after deformation;

FIG. 10 is a plan view of a modified form of hub portion; and

FIG. 11 is a section taken on the line 11-11 of FIG. 10.

DESCRIPTION OF THE PREFERRED EMBODIMENTS

With reference to FIG. 1, a micro disk 15 for data storage has a media portion 16 of flat circular shape with a substantially square central opening 17 therein. The media portion is flexible and there is a magnetic recording medium on each side thereof. A hub portion 18 has a central axis A and a spindle receiving hole 19 extending axially therethrough. The hub portion has a coupling plate 21 with a cam slot 22 therein. A chamfer 23 is provided adjacent the peripheral edge of the coupling plate on the side facing the media portion. The chamfer provides additional space for deflection of the media portion and avoids a sharp corner that might contact the media portion. Projecting axially from the coupling plate side facing the media is a boss 24 that has a media support surface 26 extending in a radial plane relative to the central axis. A pilot protrusion 27 projects axially from the media support surface. This pilot protrusion has an external cross-sectional configuration shaped to interfit with the central opening 17 in the media portion and mechanically lock the media portion against rotation thereon. Four locking tabs 28 project axially from the pilot protrusion. A washer 29 fits about the pilot protrusion on the opposite side of the media portion from the media support surface. This washer can be held in place by the locking tabs after deformation thereof.

Looking now at FIG. 2, a prior art, micro disk D has a media portion M and a hub portion H. The hub portion has a hollow cylindrical portion C and a radial flange F. The media portion is fastened to the radial flange by an adhesive ring B. The hub portion is mounted on a spindle S, shown in phantom line, having a turntable T with an elevated seat E. The hub portion is drawn toward and held in place on the elevated seat by magnetic attraction. The magnet being located on the turntable extending radially outward from the elevated seat. Thus, the hub is axially positioned on the spindle. An inner recording track $T_2$ on the media portion M is spaced from the radial flange F by a radial dimension $R_2$. This micro disk has poor flexibility of the media portion at the inner recording track. Such flexibility or stiffness increases friction requiring more drive torque and effects head loading compliance resulting in performance inconsistencies.

As shown in FIG. 3, the media portion 16 has an inner recording track $T_3$ that is spaced radially from the axis A by the same dimension as the inner recording track $T_2$, shown in FIG. 2. However, the radial dimension $R_3$ of unsupported media between track $T_3$ and the media support, including the boss 24 and the washer 29, is substantially greater than $R_2$. It has been found that deflection of the media portion for a given loading at the inner recording track is proportional to the radial dimension of unsupported media between the inner recording track and the media support. Thus, the media portion 16 has greater flexibility at track $T_3$ than the prior art media portion M has at the track $T_2$.

FIGS. 4-6 show the hub portion 18 in more detail and illustrate how the hub portion can be radially centered and rotated. It should be noted that the hub portion can be oriented in either a horizontal or vertical position depending upon the orientation of the disk drive to which it is mounted. The spindle receiving hole 19 has a substantially square cross-sectional shape but with rounded corners. Within the cam slot 22, the coupling plate 21 has a cam edge 31 and a driven edge 32. When the hub portion is mounted on a round spindle S, as shown in FIG. 6, and rotated in the direction of arrow 33, a drive dog 34 (spring loaded radially) on the spindle turntable engages the cam edge, forcing the hub portion radially outward, as indicated by the arrow 36. This centers the hub portion with the two orthogonal sides of the hole 19 that are remote from the drive dog wedged against the rounded spindle.

FIG. 5 shows the locking tabs 28 at a slight skew because of the section angle, however, the section of FIG. 7 is taken normal to the locking tabs. FIGS. 8-9 represent assembly of the media portion 16 and the hub portion 18. The media portion is placed about the pilot protrusion 27 on the boss 24. The washer 29 is placed on the opposite side of the media portion from the boss. The locking tabs 28, shown in FIG. 8, fit through the central opening in the washer. These locking tabs can be deformed, as shown in FIG. 9, to hold the washer in place. Deformation of the locking tabs can be accomplished by various methods including ultrasonically upsetting.

Looking now at FIG. 10, a second embodiment of the invention is illustrated. This embodiment is similar to the embodiment previously described, but has a modified coupling plate 37. Instead of a cam slot, a simple notch 38 is provided in the peripheral edge of the coupling plate. A torque transmission edge 39 is engaged by a drive dog 41 for rotating the coupling plate in the direction of arrow 40. A spindle receiving hole 42 of orthogonal shape is provided in the coupling plate. A leaf spring 43 extends across the corner of the hole nearest the edge 39. This leaf spring can be deflected by the spherical end of a round spindle S, as the spindle is inserted into the hole. Then, the resilient energy stored in the leaf spring forces the coupling plate radially towards the drive dog, centering the two orthogonal sides of the hole 42 remote from the drive dog to wedge against the round spindle. As shown in FIG. 11, the leaf spring has an end portion 44 that is anchored in the coupling plate, either by insertion into a narrow groove or by embedment therein upon molding the plate. An enlarged slot 46 is provided in the coupling plate for enabling deflection of the leaf spring to receive the spindle S in the hole 42.

The hub portions of both embodiments can be formed from metal or a combination of metal and plastic. Also, these portions can be manufactured by injection molding utilizing a nylon compound which has been loaded with magnetic sensitive particles. To achieve greater magnetic sensitivity, a stainless steel insert can be incorporated within the molded plastic material.

From the foregoing description, it will be seen that the micro disk 15 has a media portion 16 with good flexibility at the inner recording track $T_3$ because of the large radial dimension $R_3$ of unsupported media. This flexibility compensates for variations of the spindle-to-head dimension in disk drive systems, making the disk suitable for double sided, high density, data storage applications. The media portion is mechanically locked against rotation upon the hub portion 18 by the substantially square central opening 17 and the pilot protrusion 27 that interfits therewith. Thus, angular displacement or creepage between the media portion and the hub portion is eliminated. The leaf spring 43 is a simplified way of centering the coupling plate 37 on the spindle S. The notch 38 with the torque transmission edge 39 provides contact for rotation of the plate by the drive dog 41.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A micro disk for data storage comprising:
   a media portion of flat circular shape having a central opening therein, said media portion being flexible with a magnetic recording medium on each side;
   a hub portion having a central axis, said hub portion including means for supporting the media portion adjacent the central opening in a radial plane relative to the hub portion central axis; an
   coupling means by which the hub portion can be axially positioned, radially centered, and rotated, said coupling means being spaced axially of the hub portion from the media support means and projecting radially of the central axis by a greater dimension than the radial projection of the media support means;
   whereby the media portion extends unsupported radially outward from the media support means beside the coupling means and there beyond so that the media portion beyond the coupling means is flexible.

2. The micro disk of claim 1 wherein,
the radial projection of the coupling means is more than double the radial projection of the media support means.

3. The micro disk of claim 1 wherein,
the media portion is spaced axially of the hub from the coupling means to avoid contact with the coupling means upon normal deflection.

4. The micro disk of claim 1 wherein,
the coupling means has a peripheral edge with a chamfer adjacent the media portion to provide spacing for deflection of the media portion and to avoid a sharp corner that might contact the media portion.

5. The micro disk of claim 1 wherein,
said media support means of the hub portion includes a pilot protrusion that fits through the central opening in the media portion, said pilot protrusion having an external cross-sectional configuration that interfits with the central opening to mechanically lock the media portion against rotation on the pilot protrusion.

6. The micro disk of claim 5 wherein,
said media support means of the hub portion includes a media support surface at one end of the pilot protrusion for contacting one side of the media portion;
a washer that fits about the pilot protrusion for contacting the opposite side of the media portion; and
tabs on the end of the pilot protrusion adjacent the washer that can be deformed to lock the washer and media portion in place.

7. The micro disk of claim 6 wherein,
said hub portion has a spindle receiving hole that extends axially therethrough, said hub portion coupling means includes a coupling plate having a cam slot therein spaced radially outward from the spindle receiving hole.

8. The micro disk of claim 6 wherein,
said hub portion has a spindle receiving hole that extends axially therethrough, said hub portion coupling means includes a coupling plate having a peripheral edge with a notch therein defining a torque transmission edge by which the plate can be rotated.

9. The micro disk of claim 8 wherein,
said coupling plate has a slot therein extending across the spindle receiving hole, and a leaf spring mounted within the slot for radially centering the hub portion.

10. The micro disk of claim 9 wherein,
the hub portion is formed by injection molding utilizing a nylon compound which has been loaded with magnetic sensitive particles, and the leaf spring is embedded within the hub portion.

* * * * *